(12) United States Patent
Ramezani

(10) Patent No.: US 12,051,930 B2
(45) Date of Patent: Jul. 30, 2024

(54) BATTERY PACK IDENTIFICATION IN POWER TOOL

(71) Applicant: Black & Decker Inc., New Britain, CT (US)

(72) Inventor: Mehdi Ramezani, Cockeysville, MD (US)

(73) Assignee: Black & Decker Inc., New Britain, CT (US)

( * ) Notice: Subject to any disclaimer, the term of this patent is extended or adjusted under 35 U.S.C. 154(b) by 21 days.

(21) Appl. No.: 17/842,955

(22) Filed: Jun. 17, 2022

(65) Prior Publication Data

US 2023/0411978 A1      Dec. 21, 2023

(51) Int. Cl.
| | |
|---|---|
| *B25F 5/00* | (2006.01) |
| *H02J 7/00* | (2006.01) |
| *H02K 5/04* | (2006.01) |
| *H02K 11/00* | (2016.01) |
| *H02P 6/16* | (2016.01) |
| *H02M 7/5387* | (2007.01) |

(52) U.S. Cl.
CPC .............. *H02J 7/0048* (2020.01); *B25F 5/00* (2013.01); *H02J 7/00711* (2020.01); *H02K 5/04* (2013.01); *H02K 11/0094* (2013.01); *H02P 6/16* (2013.01); *H02M 7/53871* (2013.01)

(58) Field of Classification Search
CPC ....... H02J 7/0048; H02J 7/00711; B25F 5/00; H02K 11/0094; H02P 6/16; H02M 7/53871
See application file for complete search history.

(56) References Cited

U.S. PATENT DOCUMENTS

2016/0287265 A1* 10/2016 Macdonald ......... H01M 10/052
2021/0091687 A1*  3/2021 Obermann ................ B25F 5/00

* cited by examiner

*Primary Examiner* — Cortez M Cook
(74) *Attorney, Agent, or Firm* — Amir R. Rohani

(57) ABSTRACT

A power tool is provided including: a housing including a battery receiving portion configured to receive a removeable power tool battery pack and a motor housing; a brushless direct-current (BLDC) motor disposed within the motor housing, the motor including a stator and a rotor; a power switch circuit disposed between the battery receiving portion and the motor; and a controller that controls a switching operation of the power switch circuit to regulate a supply of power from the battery pack to the motor. At tool start-up, the applies a series of voltage pulses to the motor and measures a corresponding series of motor phase current values to identify an initial position of the rotor relative to the stator. Further, the controller identifies at least one of an impedance or a capacity of the battery pack as a function of the motor phase current values.

14 Claims, 13 Drawing Sheets

| Voltage Pulse | UH, VH, WH | UL, VL, WL | Angle (Degrees) |
|---|---|---|---|
| V1 | 1, 0, 0 | 0, 1, 1 | 0 |
| V2 | 1, 1, 0 | 0, 0, 1 | 60 |
| V3 | 0, 1, 0 | 1, 0, 1 | 120 |
| V4 | 0, 1, 1 | 1, 0, 0 | 180 |
| V5 | 0, 0, 1 | 1, 1, 0 | 240 |
| V6 | 1, 0, 1 | 0, 1, 0 | 300 |

| Battery Pack (Configuration) | C_TH Capacitance (nF) | Battery Capacity (Ah) | Battery Impedance (Ω) |
|---|---|---|---|
| 108a (1P) | 10 | 3 | 0.12 |
| 108b (2P) | 20 | 6 | 0.06 |
| 108c (3P) | 40 | 9 | 0.03 |
| 108d (2P) | 80 | 8 | 0.04 |

FIG. 10
(PRIOR ART)

BATTERY PACK IDENTIFICATION IN POWER TOOL

FIELD

This disclosure relates to a scheme for identification of a type or capacity of a battery pack in a power tool.

BACKGROUND

Use of Brushless Direct-Current (BLDC) motors in power tools has become common in recent years. A typical BLDC motor includes a stator including a series of windings that form three or more phases, and a rotor including a series of magnets that magnetically interact with the stator windings. As the phases of the windings are sequentially energized, they cause rotation of the rotor. BLDC motors are electronically commutated, requiring a controller to commutate proper phases of the motor based on the angular position of the rotor. The motor may be provided with a series of Hall sensors that detect a magnetic field of the rotor and provide signals to the controller indicative of the rotor position. Alternatively, the motor controller may be provided with a sensorless control scheme, where the angular position of the rotor is detected via the motor induced voltage and/or current signals.

Cordless power tools may be operated using a removable and rechargeable battery pack. The battery pack typically includes a series of lithium-based battery cells electrically connected in series to provide a total rated voltage greater than the rated voltage of individual battery cells. In an example, a string of five battery cells may be connected in series to provide the battery pack with a rated (maximum) voltage of approximately 20V and a nominal voltage of approximately 18V. The strings of battery cells may be connected in parallel to provide a rated capacity greater than the rated capacity of individual battery cells. Battery cell capacity is a measure (typically in Ampere-hours) of the charge stored in the battery cell and represents the maximum amount of energy that can be extracted from the battery cell. In an example, two strings of 3 A.h. cells may be connected in parallel inside the battery pack to provide the battery pack with a rated capacity of 6 A.h.

Battery packs having different rated capacities may be provided for powering a variety of power tools having different performance and power characteristics. Conventionally, a power tool designed to operate with a low capacity battery pack has often been deemed unsuitable and inefficient for use with a high capacity battery pack as it does not utilize the full power capability of the battery pack. Similarly, a power tool designed to operate with a high capacity battery pack is deemed unsuitable for use with a low capacity battery pack as its high current draw is incompatible with and potentially harmful to the battery pack. What is needed is a system for controlling and configuration the power tools in a way to allow utilization of battery packs having different rated capacities with a wide range of power tools having different power and performance characteristics with optimal efficiency.

SUMMARY

According to an aspect of the disclosure, a power tool is provided including: a housing including a battery receiving portion configured to receive a removeable power tool battery pack and a motor housing; a brushless direct-current (BLDC) motor disposed within the motor housing, the motor including a stator and a rotor; a power switch circuit disposed between the battery receiving portion and the motor; and a controller configured to control switching operation of the power switch circuit to regulate a supply of power from the battery pack to the motor. In an embodiment, at tool start-up, the applies a series of voltage pulses to the motor and measures a corresponding series of motor phase current values to identify an initial position of the rotor relative to the stator. Further, in an embodiment, the controller is configured to identify at least one of an impedance or a capacity of the battery pack as a function of the motor phase current values.

In an embodiment, the motor includes three phases and the phase current values includes six current signals.

In an embodiment, the controller is configured to measure a bus voltage of a bus line provided between the battery receiving portion and the power switch circuit, and calculate a battery identifier as a function of a sum of the phase current values divided by the bus voltage.

In an embodiment, the controller is further configured to apply a high magnitude voltage pulse to a sector of rotor orientation corresponding to the initial position of the rotor relative to the stator and measure a corresponding high-magnitude current value.

In an embodiment, the controller is further configured to monitor a bus voltage drop on a bus line provided between the battery receiving portion and the power switch circuit, and identify at least one of the impedance or the capacity of the battery pack as a function of the high-magnitude current value and the bus voltage drop.

In an embodiment, the controller is configured to calculate a battery identifier as a function of the plurality of motor phase current values, and identify the battery pack as a first type of battery pack having a first capacity if the battery identifier is below a threshold value and as a second type of battery pack having a second capacity if the battery identifier is above the threshold value.

In an embodiment, the controller is configured to set the threshold value based on the initial position of the rotor relative to the stator.

According to an embodiment, a power tool is provided including: a housing including a battery receiving portion configured to receive a removeable power tool battery pack and a motor housing; a brushless direct-current (BLDC) motor disposed within the motor housing, the motor including a stator and a rotor; a power switch circuit disposed between the battery receiving portion and the motor; a bus line provided between the battery receiving portion and the power switch circuit; and a controller configured to control switching operation of the power switch circuit to regulate a supply of power from the battery pack to the motor. In an embodiment, at tool start-up, the applies a series of voltage pulses to the motor and measures a corresponding series of motor phase current values to identify an initial position of the rotor relative to the stator. Further, in an embodiment, the controller is configured to apply a high magnitude voltage pulse to a sector of rotor orientation corresponding to the initial position of the rotor relative to the stator, measure a corresponding high-magnitude current value, and identify at least one of an impedance or a capacity of the battery pack as a function of the high-magnitude current value.

In an embodiment, the controller is further configured to monitor a bus voltage drop on the bus line and identify at least one of the impedance or the capacity of the battery pack as a function of the high-magnitude current value and the bus voltage drop.

In an embodiment, the controller is further configured to identify at least one of the impedance or the capacity of the battery pack as a function of the phase current values.

In an embodiment, the controller is configured to measure a bus voltage of the bus line and calculate a battery identifier as a function of the high-magnitude current value, the phase current values, and the bus voltage.

In an embodiment, the controller is configured to calculate a battery identifier as a function of the motor phase current values, and identify the battery pack as a first type of battery pack having a first capacity if the battery identifier is below a threshold value and as a second type of battery pack having a second capacity if the battery identifier is above the threshold value.

In an embodiment, the controller is configured to set the threshold value based on the initial position of the rotor relative to the stator.

Additional features and advantages of various embodiments will be set forth, in part, in the description that follows, and will, in part, be apparent from the description, or may be learned by the practice of various embodiments. The objectives and other advantages of various embodiments will be realized and attained by means of the elements and combinations particularly pointed out in the description herein.

BRIEF DESCRIPTION OF THE DRAWINGS

The drawings described herein are for illustration purposes only and are not intended to limit the scope of this disclosure in any way.

FIG. 10 is a prior art table depicting different capacitance values for different capacity battery packs, according to an embodiment;

Throughout this specification and figures like reference numbers identify like elements.

DETAILED DESCRIPTION

It is to be understood that both the foregoing general description and the following detailed description are exemplary and explanatory only and are intended to provide an explanation of various embodiments of the present teachings.

Figure 1:
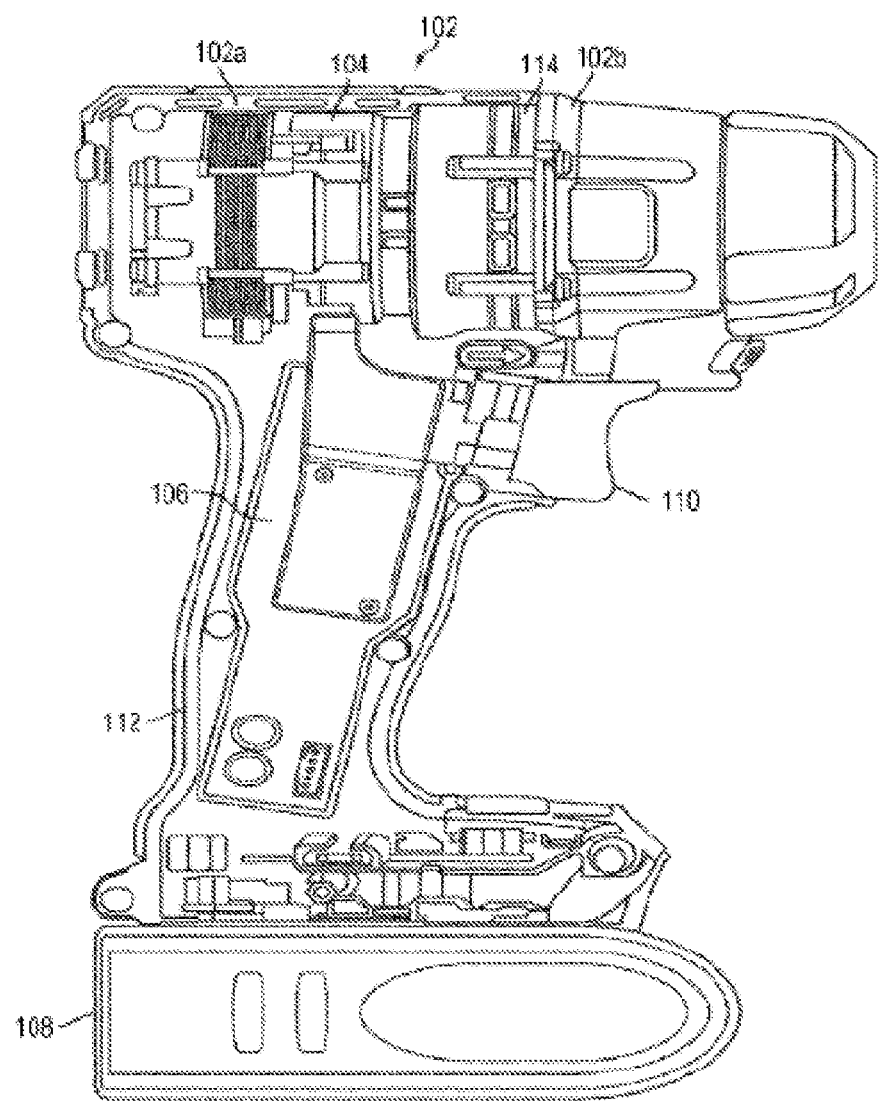
FIG. 1 is a cross-sectional view of an example power tool according to an embodiment.

With reference to the FIG. 1, a power tool 100 constructed in accordance with the teachings of the present disclosure is illustrated in a longitudinal cross-section view. The power tool 100 in the particular example provided may be a drill or impact driver, but it will be appreciated that the teachings of this disclosure is merely exemplary and the power tool of this invention could be a hammer, grinder, impact wrench, circular saw, reciprocating saw, or any similar portable power tool constructed in accordance with the teachings of this disclosure. Moreover, the output of the power tool driven (at least partly) by a transmission constructed in accordance with the teachings of this disclosure need not be in a rotary direction.

The power tool shown in FIG. 1 may include a tool housing 102, a motor assembly 104, a control module 106, an input unit (e.g., a variable speed trigger) 110, a transmission assembly 114, an output spindle, and a chuck that can be coupled for rotation with the output spindle.

According to an embodiment, the motor 104 is received in the housing 102. The motor can be any type of motor and may be powered by an appropriate power source (electricity, pneumatic power, hydraulic power). In the particular example provided, the motor is a brushless DC electric motor and is powered by a battery pack 108. An input unit 110 is mounted in the handle 112 of the housing 102. The input unit 110 may be a variable speed trigger switch, although other input means such as a touch-sensor, a capacitive-sensor, a speed dial, etc. may also be utilized. In an embodiment, variable speed trigger switch may integrate the ON/OFF, Forward/Reverse, and variable-speed functionalities into a single unit and provide respective inputs of these functions to the control unit 106. The control unit 106, which is coupled to the input unit 110, supplies the drive signals to the motor. In the exemplary embodiment of the invention, the control unit 106 is provided in the handle 112.

Construction details of the brushless motor 104 or the control unit 106 are beyond the scope of this disclosure, and they can be found in co-pending International Patent Publication No. WO2011159674 by the same assignee as this application, which is incorporated herein by reference in its entirety. In an embodiment, motor 104 includes a stator provided with a series of coils that are selectively energized from the battery pack 108 and a rotor provided with a series of magnets that interact with the stator coils to cause rotation of the rotor. It is generally known that larger motor stators (i.e., ones with larger diameters and length) produce higher power outputs so long as the battery pack 108 has sufficient capacity to power the motor.

The brushless motor 104 depicted in FIG. 1 is commutated electronically by the control unit 106. The control unit 106 may include a controller, for example, a programmable micro-controller, micro-processor, or other programmable module or a non-programmable brushless control integrated circuit, configured to control supply of DC power to the motor 104 and accordingly commutate the motor 104. Alternatively, the controller may include an application-specific integrated circuit (ASIC) configured to execute commutation of the motor 104. The tool 100 is powered by a suitable power source such as the battery pack 108. It is envisioned, however, that aspects of the present disclosures can be applied to a power tool with an AC power source, which in some embodiments may further include a full-wave or half-wave rectifier to power to motor. Using the variable-speed input and other inputs from the input unit 110, the control unit 106 controls the amount of power supplied to the motor 104. In an exemplary embodiment, the control unit 106 controls the pulse width modulation (PWM) duty cycle of the DC power supplied to the motor 104.

Figure 2:
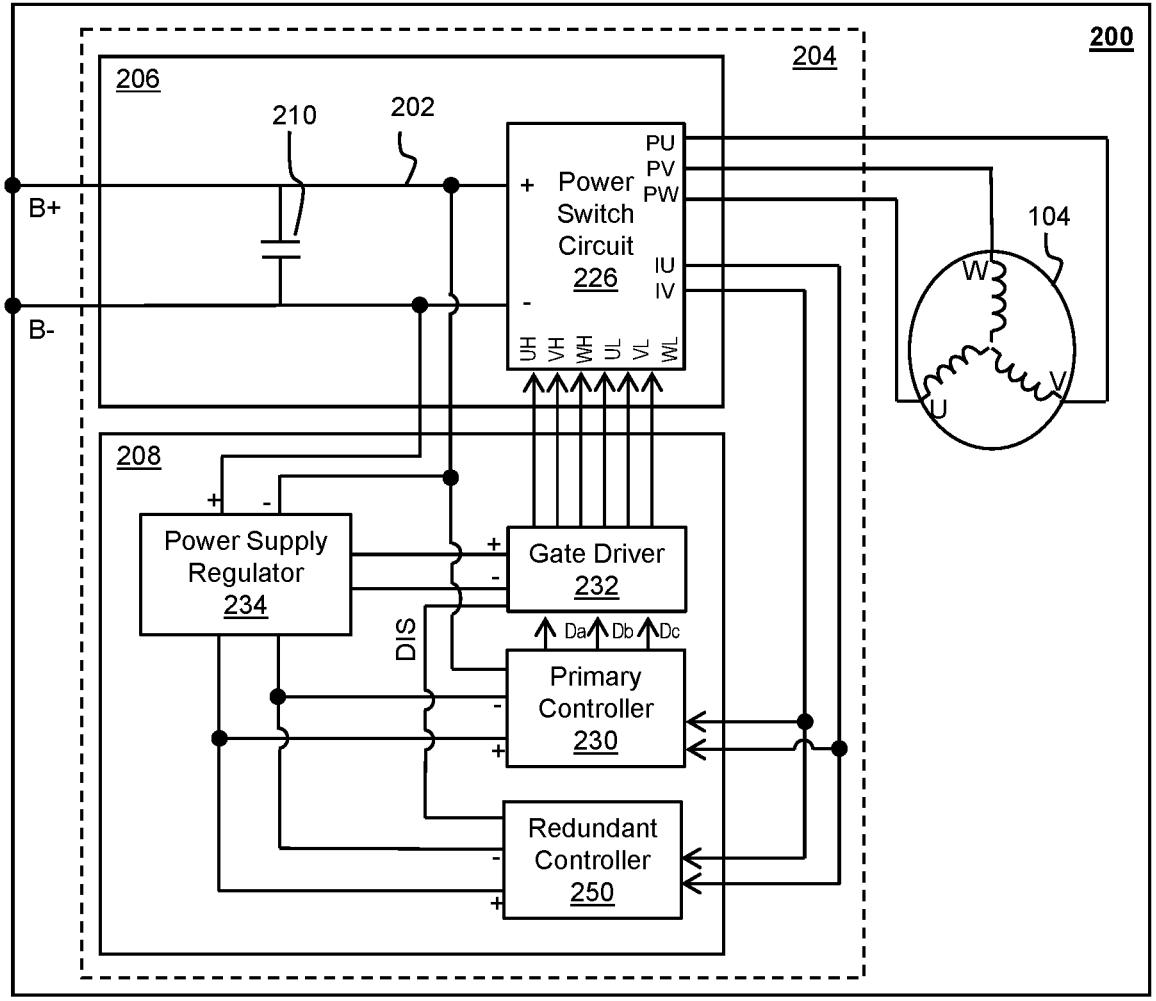
FIG. 2 is a diagram depicting are example motor control system which may be employed by a power tool, according to an embodiment.

Referring to FIG. 2, a circuit block diagram 200 of power tool 100 including, a motor control circuit 204 for controlling a supply of electric power to the motor 104, according to an embodiment. In an embodiment, motor control circuit 204, which may be a part of control module 106 of FIG. 1, includes a power unit 206 and a control unit 208. In an embodiment, motor control circuit 204 receives DC power from removeable battery pack 108.

In an embodiment, power unit 206 may include DC bus line 202 coupled to the power source B+ and B− terminals, a DC bus capacitor 210 coupled across the DC bus line 202, and a power switch circuit 226 coupled between the DC bus line 202 and motor windings of BLDC motor 104. In an embodiment, power switch circuit 226 may be a three-phase bridge driver circuit including six controllable semiconductor power devices, e.g. Field-Effect Transistors (FETs), Bipolar Junction Transistors (BJTs), Insulated-Gate Bipolar Transistors (IGBTs), etc.

In an embodiment, control unit 208 may include a controller 230, a gate driver 232, and a power supply regulator 234. In an embodiment, controller 230 is a programmable device arranged to control a switching operation of the power devices in power switching circuit 226. In an embodiment, controller 230 calculates the rotational position of the rotor using a variety of methods. One such method is by measuring the inductive current of the motor 104 to calculate the motor back-EMF (Electro-Motive Force) voltage of the motor and use the motor back-EMF in combination with other factors to calculate the rotor position, as discussed later in detail. Controller 230 may also receive a variable-speed signal indicative of a position of the variable-speed trigger 110. Based on the calculated rotor position and the variable-speed signal, controller 230 controls commutation sequence of the motor 104. In an embodiment, controller 230 outputs drive signals Da, Db, and Dc to the gate driver 232. In an embodiment, drive signals Da, Db and Dc are generated by controller 230 using a Space-Vector Modulation technique as discussed later in detail. Gate driver generates output drive voltage signals UH, VH, WH, UL, VL, and WL at voltage levels suitable to drive the gates of the semiconductor switches within the power switch circuit 226. Gate driver 232 includes internal circuitry to generate the six voltage signals from the 3 drive signals Da, Db, and Dc. By control a PWM switching operation of the power switch circuit 226 via the drive signals, controller 230 controls the direction and speed by which the motor windings are sequentially energized, thus electronically controlling the motor 104 commutation.

In an embodiment, power supply regulator 234 may include one or more voltage regulators to step down the power supply to a voltage level compatible for operating controller 230 and/or the gate driver 232. In an embodiment, power supply regulator 234 may include a buck converter and/or a linear regulator to reduce the power voltage of the power supply to, for example, 15V for powering the gate driver 232, and down to, for example, 3.2V for powering controller 230.

In an embodiment, a power switch (not shown) may be provided between the power supply regulator 234 and the gate driver 232. The power switch may be a current-carrying ON/OFF switch coupled to the ON/OFF trigger or the variable-speed actuator to allow the user to begin operating the motor 104, as discussed above. The power switch in this embodiment disables supply of power to the motor 104 by cutting power to the gate drivers 232. It is noted, however, that the power switch may be provided between the rectifier circuit 220 and the power switch circuit 226 or other suitable location. It is further noted that in an embodiment, power tool 10 may be provided without an ON/OFF switch, and controller 230 may be configured to activate the power devices in power switch circuit 226 when the ON/OFF trigger (or variable-speed actuator) is actuated by the user.

In an embodiment, controller 230 controls commutation of the motor 104 using a vector control technique referred to as field-oriented control (FOC). FOC is a variable-frequency drive control algorithm that provides several advantages over conventional trapezoidal control or voltage-over-frequency (V/Hz) control schemes often used in power tools having brushless DC motors.

In FOC, the three phase currents of the stator are measured and converted to two orthogonal components that can be combined in a vector. The first component, known as direct current (Id), is the magnetic flux of the motor induced in the stator windings 52 due to rotation of the rotor within the stator. This component runs parallel to the pole axis of the rotor and does not apply a rotational force on the rotor. The second component, known as quadrature current (Iq), is the torque. This component runs perpendicular to the pole axis of the rotor and applies force generating rotational torque. These two components can be controlled independently. The Id current is typically desired to be 0 to minimize the unwanted direct torque component contributing to current losses for a given motor operating point. The Iq current is driven with the desired torque, which may be set, for example, according to the user's amount of trigger pull. The two orthogonal components are in the rotating reference frame such that current can be controlled irrespective of motor speed. In this way, Id and Iq currents are equivalent to effective DC quantities per a conventional DC motor. By controlling these two currents, the motor torque and speed can be directly controlled.

In an embodiment, in addition to controller 230, a secondary controller 250 is provided to determine motor speed and rotation direction. Secondary controller 250 protects the power tool from damage and the power tool user from potential harm in the event of hardware or software failure of controller 230. Such failure may lead to incorrect rotation of the motor or the motor spinning at undesirably high speed, both of which can be potentially harmful to the user.

Figure 3:
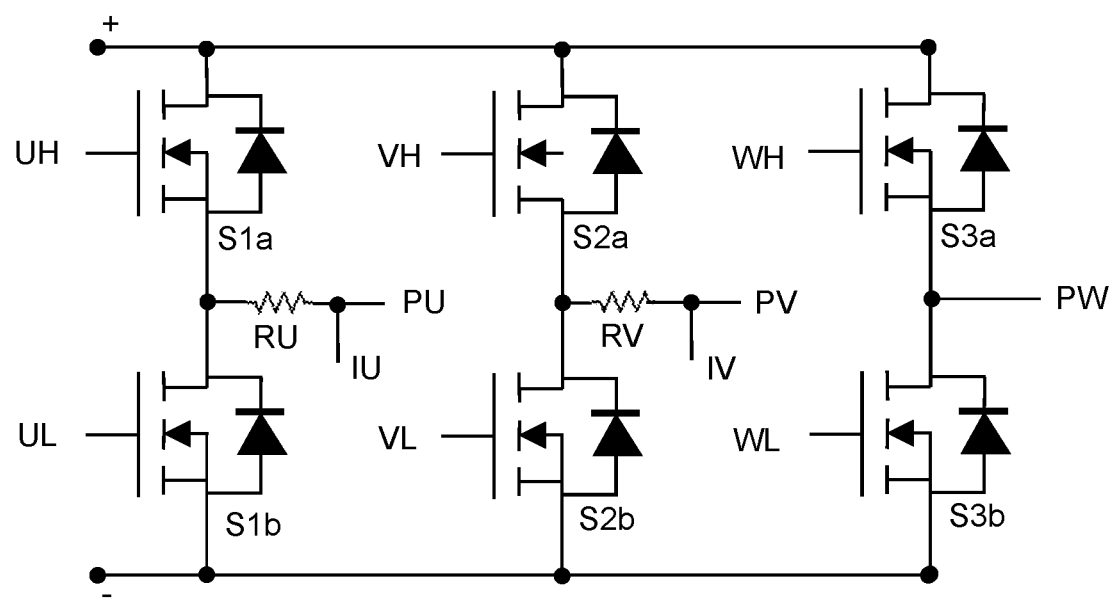
FIG. 3 is a schematic of a three-phase inverter bridge circuit, according to an embodiment.

FIG. 3A depicts an exemplary power switch circuit 226 having a three-phase inverter bridge circuit, according to an embodiment. This circuit corresponds to a three-phase motor including, for example, 3 sets of windings pairs, with each pair wound on two opposite stator teeth. It should be understood that the inverter bridge circuit may include more phases corresponding to the number of phases of the motor. As shown herein, the three-phase inverter bridge circuit includes three high-side FETs and three low-side FETs. The gates of the high-side FETs driven via drive signals UH, VH, and WH, and the gates of the low-side FETs are driven via drive signals UL, VL, and WL. In an embodiment, the drains of the high-side FETs are coupled to the sources of the low-side FETs to output power signals PU, PV, and PW for driving the BLDC motor 16.

In an embodiment, controller 230 constructs a sinusoidal voltage waveform for each phase of the motor by controlling a Space-Vector Pulse-Width Modulated (SVPWM) of the high-side and low-side FETs in accordance with the desired Id and Iq currents, as discussed later in detail. The SVPWM technique is a modulation scheme used to determine duty cycles of the PWM signals for high-side and low-side FETs in order to apply a vector voltage as a combination of three phase voltage signals to the motor. The PWM duty cycles of the FETs are varied within each phase in a way to construct phase voltages that are substantially sinusoidal in waveform and that, when applied to the motor sequentially, cause rotation of the motor in the desired direction and speed.

Using a feedback loop of the phase currents of the motor, controller 230 calculates the rotor position for use in SVPWM commutation control, as described in detail in this disclosure. In this manner, motor 16 may be controlled and commutated without a need for position sensors, such as Hall sensors, thus reducing motor size and manufacturing cost.

Figures 4, 5:
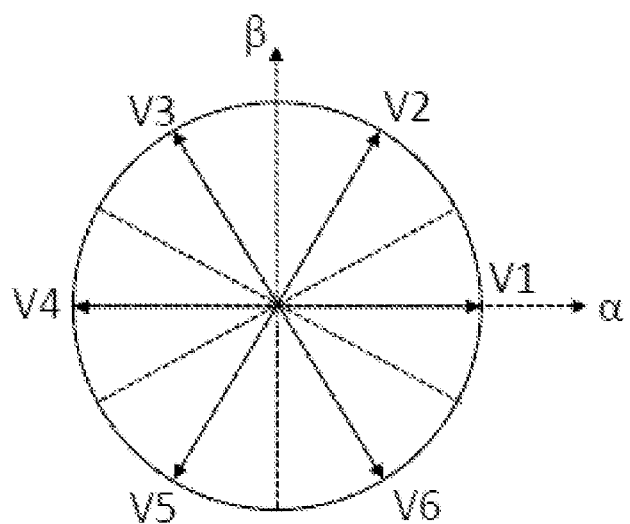
FIG. 4 depicts an exemplary excitation sequence table including high-side and low-side drive signals corresponding to rotor angles V1-V6 within a full rotation of the rotor, according to an embodiment.
FIG. 5 depicts a diagram representing a full 360-degree orientation of the rotor angles from V1 through V6, according to an embodiment.
Figure 6:
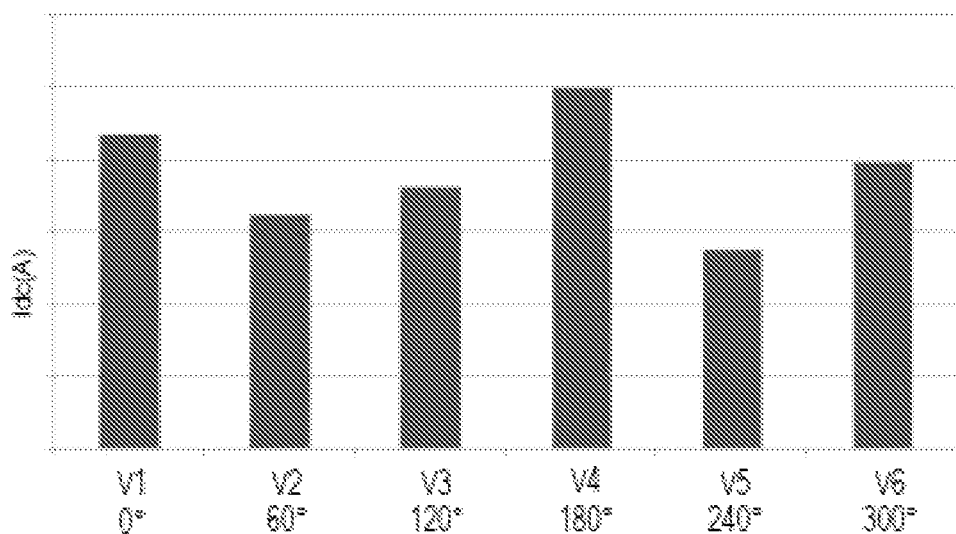
FIG. 6 depicts an exemplary diagram showing the measured current for each pulse, according to an embodiment.

Referring to FIGS. 4-6, at motor start-up, i.e., after the power tool is initially powered up, controller 230 executes a process herein referred to as Initial Position Detection (IPD) to estimate the rotor position. IPD allows controller 230 to detect the initial angular position of the rotor with approximately a 30-degree accuracy. In other words, controller 230 identifies the motor sector within which the rotor angle is located.

FIG. 4 depicts an exemplary excitation sequence table including high-side and low-side drive signals corresponding to rotor angles V1-V6 within a full rotation of the rotor, according to an embodiment. FIG. 5 depicts a diagram representing a full 360-degree orientation of the rotor angles from V1 through V6, according to an embodiment. In this embodiment, V1 through V6 correspond to 60-degree intervals of the rotor orientation beginning at 0 degrees.

The IPD process allows controller 230 to detect the initial angular position of the rotor with approximately a 30-degree accuracy. In other words, controller 230 identifies the motor sector within which the rotor angle is located. In IPD, controller 230 sequentially injects a series of voltage pulses in accordance with the drive signals of FIG. 4 at rotor angles V1 through V6. Each voltage pulse has the same voltage and duration. In this embodiment, for each voltage pulse, two high-side FETs and a low-side FET, or one high-side FET and two low-side FETs, are simultaneously activated. For example, voltage V1 (corresponding to 0-degree rotor angle) is applied by activating UH, VL and WL signals of the power switch circuit 226, voltage V2 (corresponding to 60 degrees rotor angle) is applied by activating UH, VH and WL signals of the power switch circuit 226, etc.

In an embodiment, after each voltage pulse, controller 230 measures the corresponding motor current using the shunts as previously described.

FIG. 6 depicts an exemplary diagram showing the measured current for each pulse, according to an embodiment. The voltage pulse closest to the actual the position of the rotor generates the highest inductive current. Thus, controller 230 identifies the rotor angle to be in close proximity to the angle associated with the highest-current voltage pulse. In this example, $I_{V4}$ exhibits the largest current amplitude. Thus, it is determined that the actual rotor position is in the proximity of rotor angle V4. In an embodiment, where 6 voltage pulses are applied, controller 230 identifies the rotor position as V4±30 degrees.

The IPD process described here is usually reliable for estimating the sector in which the rotor is located. It has been found, however, that in some instances, the detected current may be too close to distinctly identify the correct rotor position. For example, in FIG. 6, where the rotor position is close to V4 (180 degrees), the two largest current pulses are associated with V1 (0 degrees) and V4 (180 degrees).

In an embodiment, to solve this problem, controller 230 ensures that the largest current pulse is greater in amplitude than the second-largest current pulse by at least a threshold. For example, in the example of FIG. 6, if $I_{V4}$=20 A, $I_{V1}$=17 A, and the threshold=1 A, controller 230 determines that the difference between the two current pulses exceeds the threshold and selects angle V4 as the correct proximate area of rotor position.

However, if threshold is not satisfied, controller 230 may determine the correct angle by examining the neighboring current pulses of the two peak current pulses. The current pulse whose neighboring pulses are on average larger is the correct sector. For example, in the example of FIG. 6, controller 230 can determine whether the neighboring rotor angles of V4 (i.e., V3 and V5) have larger average current pulses than the neighboring rotor angles of V1 (i.e., V2 and V6). Since in this example $(I_{V3}+I_{V5})>(I_{V2}+I_{V6})$, controller 230 determines rotor angle V4 to be the correct proximate area of rotor position, even if the $I_{V1}$ and $I_{V4}$ pulses were closer in magnitude.

After conclusion of the IDP process, the controller 230 performs sensorless control of the motor 104, such as Field-Oriented Control, including a High-Frequency Injection (HFI) process followed by a Sliding-Mode Observer (SMO) process. These processes are beyond the scope of this disclosure. Reference is herein made to US Patent Publication No. 2020/0389108, titled "Field-Oriented Sensorless Brushless Motor Control in a Power Tool," which is incorporated herein by reference in its entirety, for a description of sensorless Field-Oriented Control of a motor.

It should be understood that the above-described IDP process may be alternatively used with other sensorless motor control schemes, such as a trapezoidal control scheme that relies on measuring the motor back-EMF voltage for sensorless control. Reference is made herein to U.S. Pat. No. 11,171,586, titled "Low-speed Sensorless Brushless Motor Control in a Power Tool," which is incorporated herein by reference in its entirety, for a description of sensorless motor control scheme using the back-EMF voltage of the motor.

Figure 7:
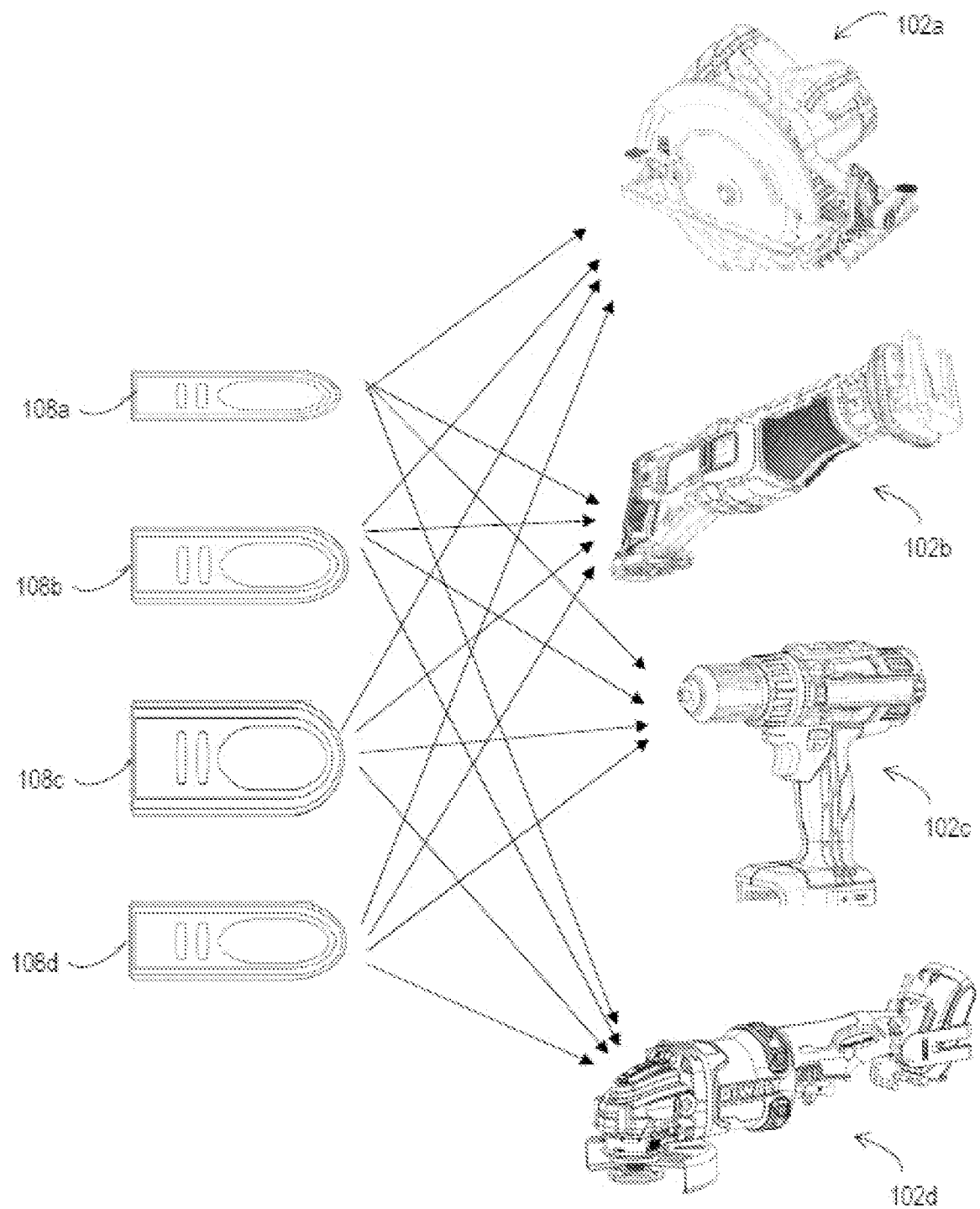
FIG. 7 is a view of a set of exemplary power tools receiving different capacity battery packs, according to an embodiment.

FIG. 7 is a view of a set of exemplary power tools 102a-102d receiving different capacity battery packs 108a-108d, according to an embodiment. In an embodiment, exemplary power tools 102a-102d in this figure are a circular saw, a reciprocating saw, a drill, and a grinder, respectively. Is should be understood, however, that these power tools are provided by way of example, and any other type of power tool, including, but not limited to, an impact tool, a hammer drill, a hammer, a wrench, an oscillator tool, a polisher, a cut-off tool, etc. may be used within this family of tools. In an embodiment, as discussed below, each power tool 102a-102d is provided with a battery pack receptacle capable of receiving any of the battery packs 108a-108d. Further, each power tool 102a-102d includes a battery detection and identification mechanism for identification of the type of battery pack 108a-108d that it receives.

Figure 8A:
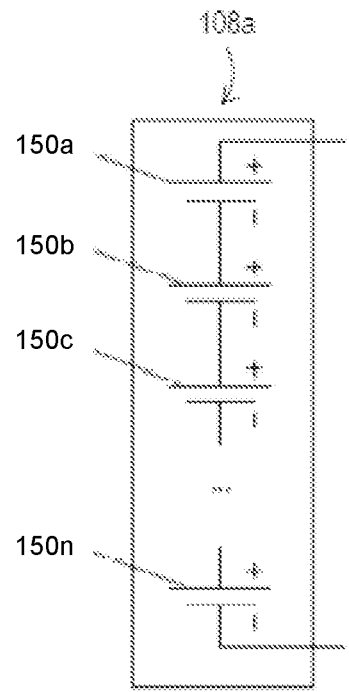
FIGS. 8A-8C depict circuit diagrams of three different battery packs having different capacities and numbers of parallel connections, respectively, according to an embodiment.
Figure 8B:
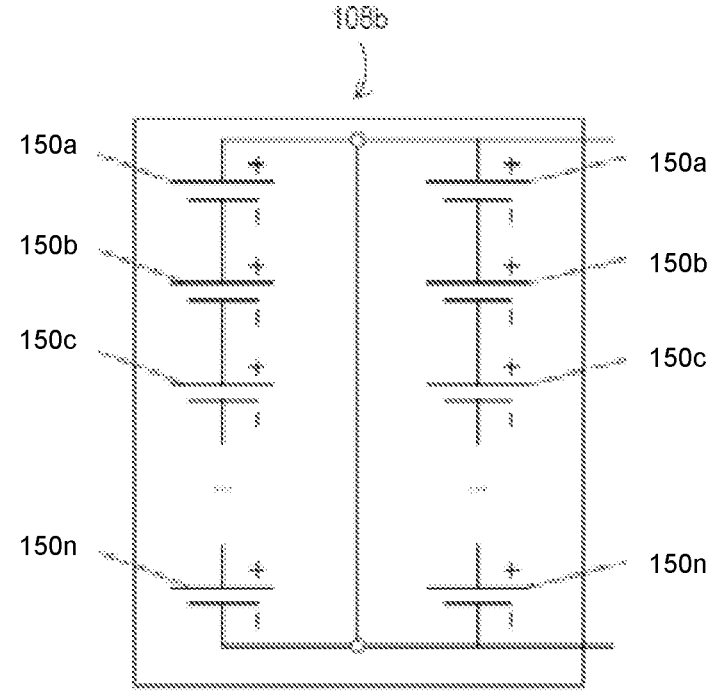
Figure 8C:
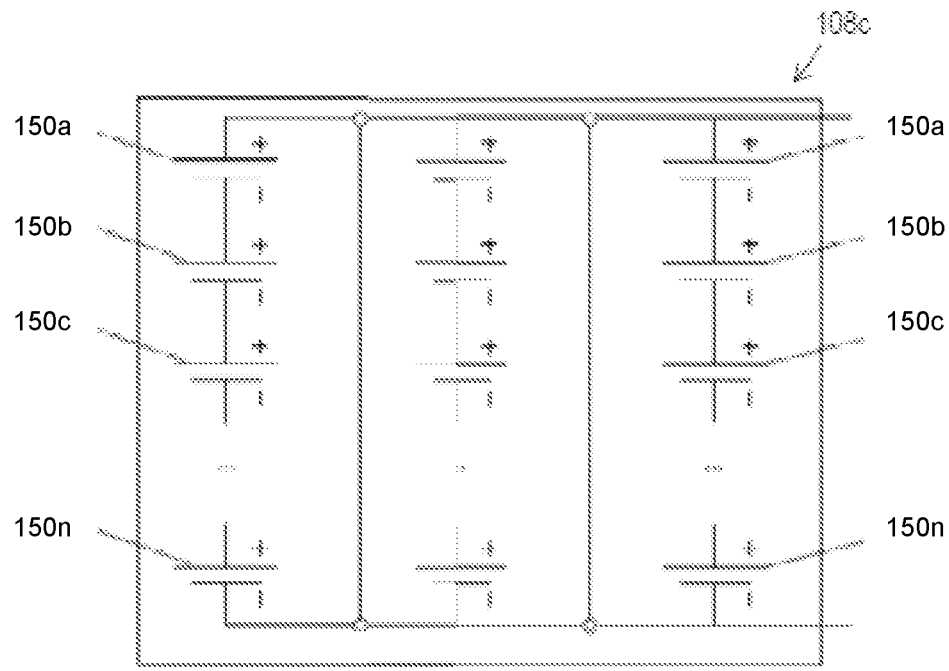

FIGS. 8A-8C depict circuit diagrams of battery packs 108a-108c, respectively, according to an embodiment.

In an embodiment, battery pack 108a is a low-capacity battery pack including a series of battery cells 150a-150n. Each battery cell 150a-150n has a lithium or lithium-ion composition having a maximum rated voltage (e.g., 4V or 4.1V) and a nominal voltage (e.g., 3.8V). The nominal voltage refers to the average state of charge below the maximum voltage within which the cells commonly operate. Low capacity battery pack 108a in this example may include five battery cells 150a-150n in series for a maximum voltage of approximately 20V and a nominal voltage of approximately 18V. In this example implementation, the battery pack 108a may have a capacity of approximately 1.5 to 3.0 Ah depending on the cell impedance.

In an embodiment, battery pack 108b is a medium-capacity battery pack including two rows of cells 150a-150n in parallel. Each row of cells 150a-150n includes the same number of cells as low-capacity battery pack 108a such that medium-capacity battery pack 108b has the same maximum rated voltage (e.g., approximately and nominal voltage (e.g., approximately 18V) as the low-capacity battery pack 108a. However, the parallel arrangement of the cells increases the capacity of the medium-capacity battery pack 108b to approximately double that of the low-capacity battery pack 108a (e.g., approximately 3.0 to 6.0 Ah), while reducing the battery pack impedance to approximately half the impedance of the low-capacity battery pack 108a.

In an embodiment, battery pack 108c is a high-capacity battery pack including three rows of cells 150a-150n in parallel. Each row of cells 150a-150n includes the same number of cells as low-capacity battery pack 108a such that high-capacity battery pack 108c has the same maximum rated voltage (e.g., approximately 20V) and nominal voltage (e.g., approximately 18V) as the low-capacity battery pack 108a and the medium-capacity battery pack 108c. However, the parallel arrangement of the cells increases the capacity of the high-capacity battery pack 108b to approximately triple that of the low-capacity battery pack 108a (e.g., approximately 4.5 to 9.0 Ah), while reducing the battery pack impedance to approximately ⅓ the impedance of the low-capacity battery pack 108a.

In an embodiment, battery pack 108d (see FIG. 7) includes the same number of parallel rows of cells as battery pack 108b, but with lower impedance battery cells. The cell battery impedance may depend upon several factors, including but not limited to, the cell chemistry, cell diameter, etc. For the purposes of this disclosure, battery pack 108a is considered a high-capacity battery pack with a capacity of approximately 5-8 Ah.

According to embodiments of the invention, battery packs 108a-d include the same rated and nominal voltages and are provided with the same terminal interface for coupling with the family of power tools 102a-d. However, battery packs 108a-d have different ampere-hour capacities. While low, medium, and high rated capacities in these examples refer to packs with one, two and three rows of battery cells connected in parallel, it should be understood that these configurations are exemplary and battery packs with higher numbers of parallel connections may be utilized. As discussed, battery capacity relates to the number of parallel connection between the battery cells, as well as cell impedance, cell chemistry, etc. It is also noted that the capacity and impedance values provided herein are by way of example and a cell with any impedance level may be incorporated into a battery pack with any number of parallel connections. For example, a 3P battery pack may be provided with very low impedance cells to achieve a capacity of 12 Ah, 15 Ah, 18 Ah.

Figure 9:
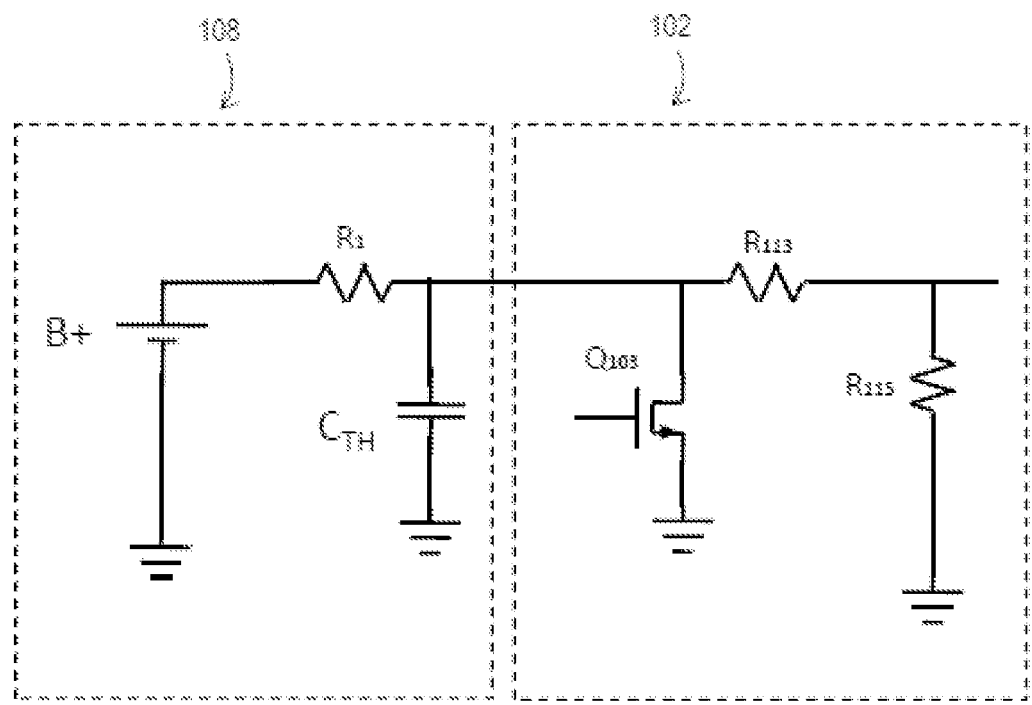
FIG. 9 is a simplified prior art circuit diagram of a battery pack identification mechanism and the corresponding power tool ID detection mechanism, according to an embodiment.

FIG. 9 is a simplified prior art circuit diagram of a battery pack identification mechanism and the corresponding power tool ID detection mechanism, according to an embodiment. In an embodiment, each battery pack 108 (i.e., 108a-108d) is provided with a RC circuit including a capacitor $C_{TH}$ and a resistor R1 couples to the battery cells. Each power tool 102 (i.e., 102a-102d) includes a switch Q103 provided parallel to the capacitor $C_{TH}$ that switchably discharges the capacitor $C_{TH}$ when it is switched ON. In an embodiment, the controller 230 activates the switch Q103 and waits a predetermined amount of time (e.g., 1-3 ms) to allow the capacitor $C_{TH}$ to fully discharge. Thereafter, the controller 230 recharges the capacitor $C_{TH}$ and calculates its capacitance based on the time it takes to recharge.

FIG. 10 is a prior art table depicting different capacitance values for different capacity battery packs 102a-d, according to an embodiment. In this example, battery configuration 1P, 2P, and 3P designate the number of parallel connections in battery pack 108a-108c. Using the calculated capacitance of $C_{TH}$, the controller 230 identifies the battery pack identification, which is associated (among other things) with the battery pack's number of parallel connections. In addition, the battery capacity (ampere-hours) and impedance (mΩ) levels determined by the controller 230 based on the calculated capacitance $C_{TH}$. In this example, low-capacity battery pack 102a has a 3 Ah capacity and a 120 mΩ pack impedance; medium-capacity battery pack 102b has a 6 Ah capacity and a 60 mΩ pack impedance; high-capacity battery pack 102c has a 9 Ah capacity and a 30 mΩ pack impedance; and high-capacity battery pack 102d has an 8 Ah capacity and a 40 mΩ pack impedance. As shown herein, the battery pack impedance is reduced as more parallel rows of cells are provided and/or as cell impedance is reduced.

In an embodiment, controller 230 utilizes the battery pack identification information to optimize the power output of the motor. For example, the controller 230 may set different current limits the different battery packs 108 so more power is driven from a higher capacity battery pack than a lower capacity battery pack. US Patent Publication No. 2021/0111649, titled "Power Tool Receiving Different Capacity Battery Packs," which is incorporated herein by reference in its entirety, describes control schemes to optimize the power output of the motor based on the battery pack identification.

In an embodiment, instead of using a resistive and/or capacitive circuit inside the battery pack 108 as an identifier, the impedance of the battery pack 108 is detected by the controller 230 during the above-described IPD process. Specifically, the signals used for detecting the initial position of the rotor are utilized to also measure the impedance of the battery pack, thus allowing the controller 230 to identify the type, capacity, and/or impedance of the battery pack 108, without the added circuitry of FIG. 9 on both the battery pack side and the tool side. This embodiment is described herein in detail.

Figure 11:
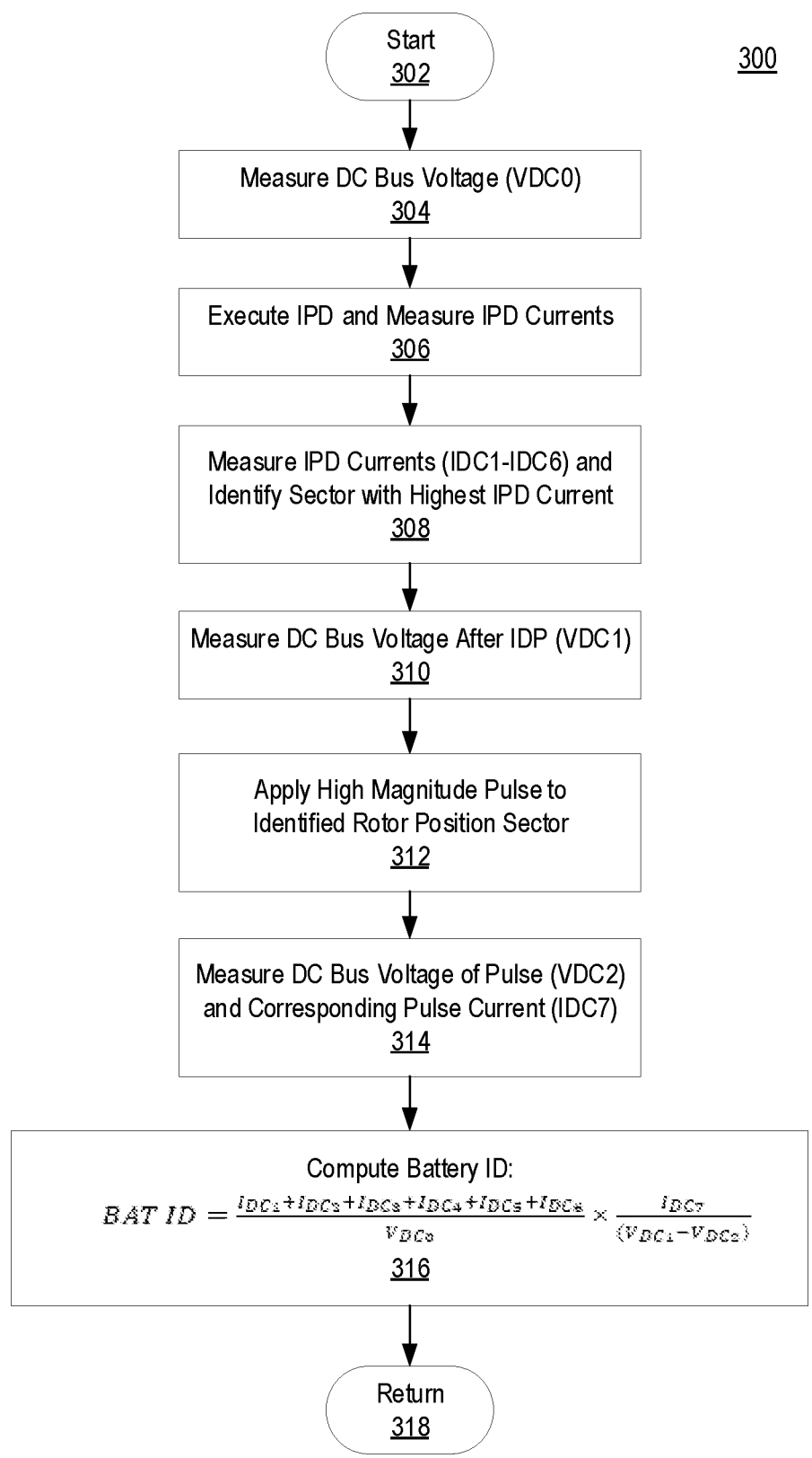
FIG. 11 depicts an exemplary flow diagram used by controller to use IPD signals for detection of the battery pack ID, according to an embodiment.
Figure 12:
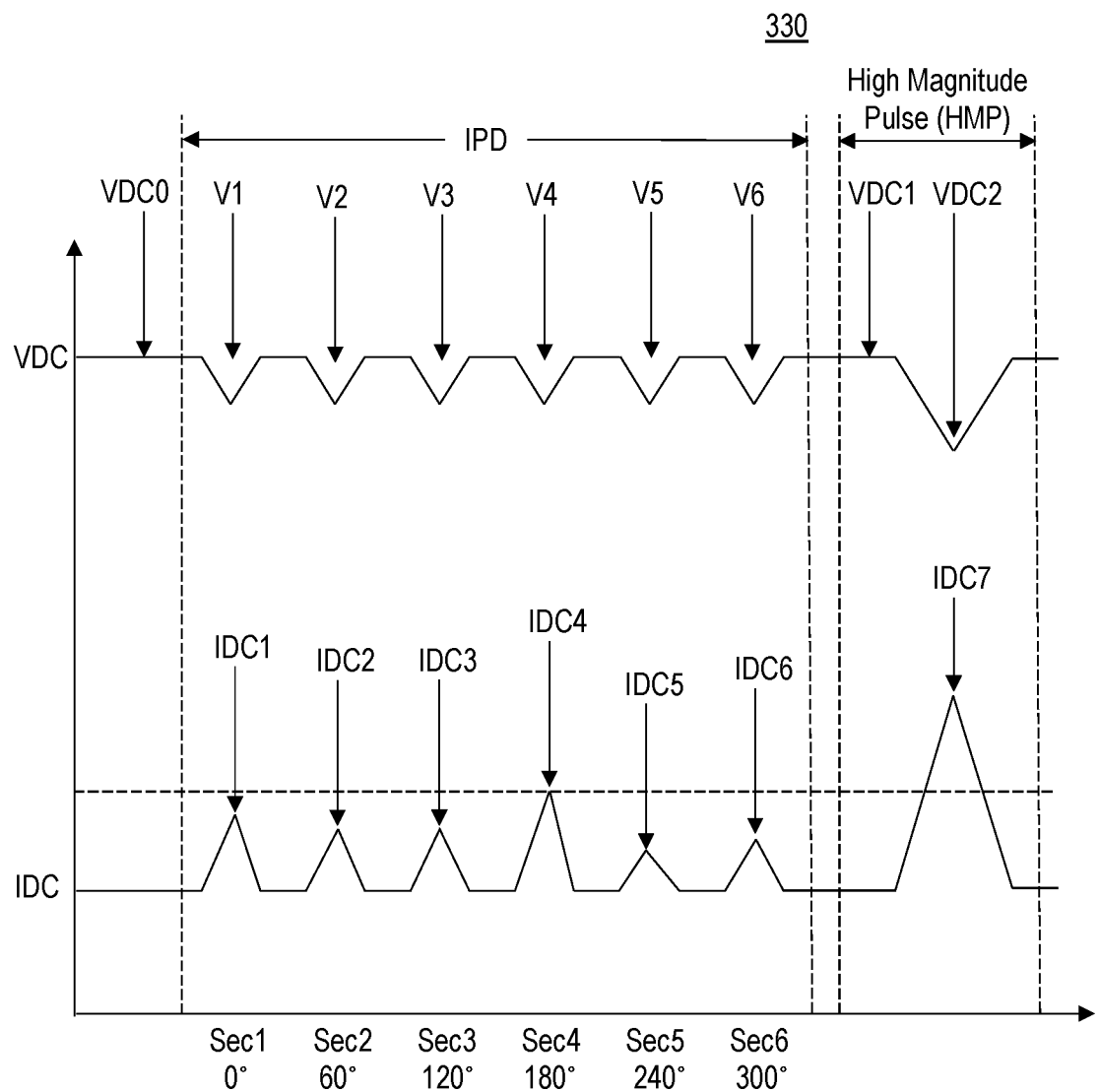
FIG. 12 depicts an exemplary graph of the DC bus voltage and motor current measurements, according to an embodiment.

FIG. 11 depicts an exemplary flow diagram 300 used by controller 230 to use IPD signals for detection of the battery pack ID, according to an embodiment. FIG. 12 depicts an exemplary graph 330 of the DC bus 202 voltage and motor current measurements, according to an embodiment. Process 300 is described with reference to the graph 300.

In an embodiment, in process 300, starting at step 302, controller 230 measures the DC bus 202 voltage (VDC0) prior to start of the IPD process. This measurement may correspond to voltage of the battery pack 108. In step 304, controller 230 proceeds to execute IPD by applying six voltage pulses V1-V6 to sectors 1-6 of the motor and measuring the corresponding phase currents IDC1-IDC6. As previously discussed, the phase current measurement with the highest magnitude corresponds to the initial position of the rotor, which in this example is sector 4.

In an embodiment, controller 230 uses the phase current measurements IDC1-IDC6 to calculate a parameter corresponding to the battery pack ID using equation (1) below. In this equation, according to Ohm's law, the sum of all IPD currents divided by VDC0 corresponds to the average conductivity and/or resistance of the battery pack as measured over the six voltage pulses V1-V6.

$$\text{BAT ID} = \frac{I_{DC1} + I_{DC2} + I_{DC3} + I_{DC4} + I_{DC5} + I_{DC6}}{V_{DC0}} \quad (1)$$

In an embodiment, controller 230 may calculate the battery pack ID using only equation (1) above. However, the IPD currents include not only current components associated with the battery conductivity and/or resistance, but also current components associated with the motor inductance. Specifically, the above-described motor 104 has an inductance that is variable with application of a current pulse. Thus, in a further embodiment, to remove or minimize the effect of the inductance of the motor on current measurement and improve the resolution the battery pack ID measurement, controller 230 applies an additional high magnitude pulse to the rotor sector identified in the IPD process (e.g., sector 4 in this example), in steps 310-316. Injection of the high magnitude pulse saturates the motor to the point that the motor inductance is diminished or negligeable, thus ensuring that the current measurement corresponding to the high magnitude pulse is most closely correlated to the battery pack conductivity and/or resistance.

In an embodiment, in step 310, controller 230 measures the DC bus 202 voltage (VDC1) after the conclusion of the IPD process. In step 312, controller 230 proceeds to apply a high magnitude voltage pulse to the rotor sector identified in the IPD process. In an embodiment, the high magnitude voltage pulse has sufficient duration (wavelength) to ensure that the motor is sufficiently saturated. In an embodiment, high magnitude voltage pulse has a duration that is approximately double the duration of the IPD voltage pulses (e.g., approximately 20 msec for IPD voltage pulses and 40 msec for the high magnitude voltage pulse).

In step 314, controller 230 measures the phase current associated with the high magnitude voltage pulse (IDC7). Controller 230 also measures the DC bus voltage (VDC2) at the same time.

In an embodiment, in step 316, controller 230 calculates a parameter corresponding to the battery pack ID using equation (2) below:

$$\text{BAT ID} = \frac{I_{DC1} + I_{DC2} + I_{DC3} + I_{DC4} + I_{DC5} + I_{DC6}}{V_{DC0}} \times \frac{I_{DC7}}{(V_{DC1} - V_{DC2})} \quad (2)$$

In this equation, VDC1-VDC2 represents the voltage drop on the DC bus line resulting from the high magnitude voltage pulse. As mentioned above, the high duration of this voltage pulse is designed to saturate the motor inductive currents and allow the battery impedance to become the dominant factor that the current IDC7 is associated with. The division of IDC7 current measurement by the voltage drop thus provides a value that is directly correlated with the battery pack conductivity and/or resistance of the battery pack. Multiplication of this value by the average conductivity of the battery pack as measured over the six voltage pulses V1-V6 provides a high resolution parameter that varies by the impedance of the battery pack and can therefore be used as a battery pack identifier. In an embodiment, controller 230 terminates the process at step 318.

Figure 13:
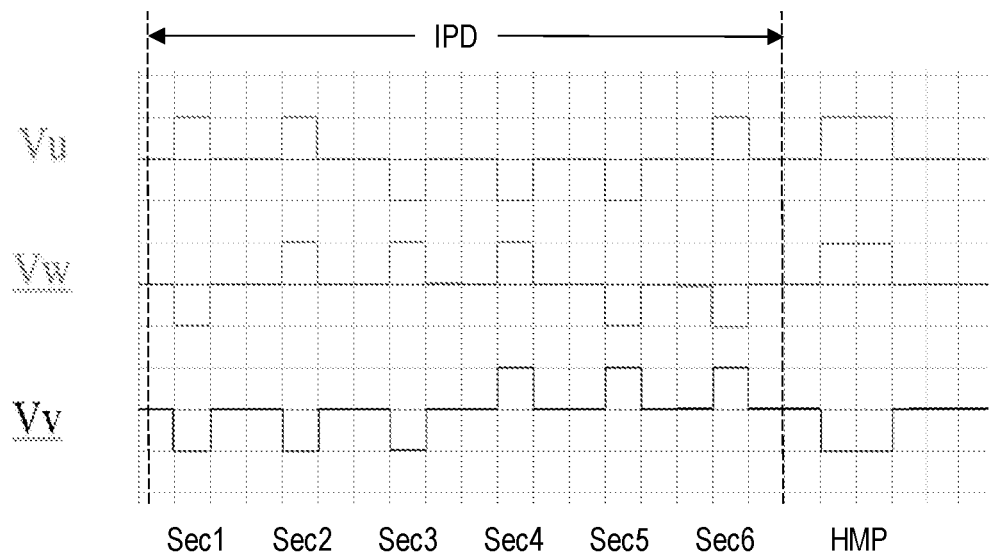
FIG. 13 depicts a voltage waveform diagram showing the voltage signals applied to the motor during process described above, according to an embodiment.
Figure 14:
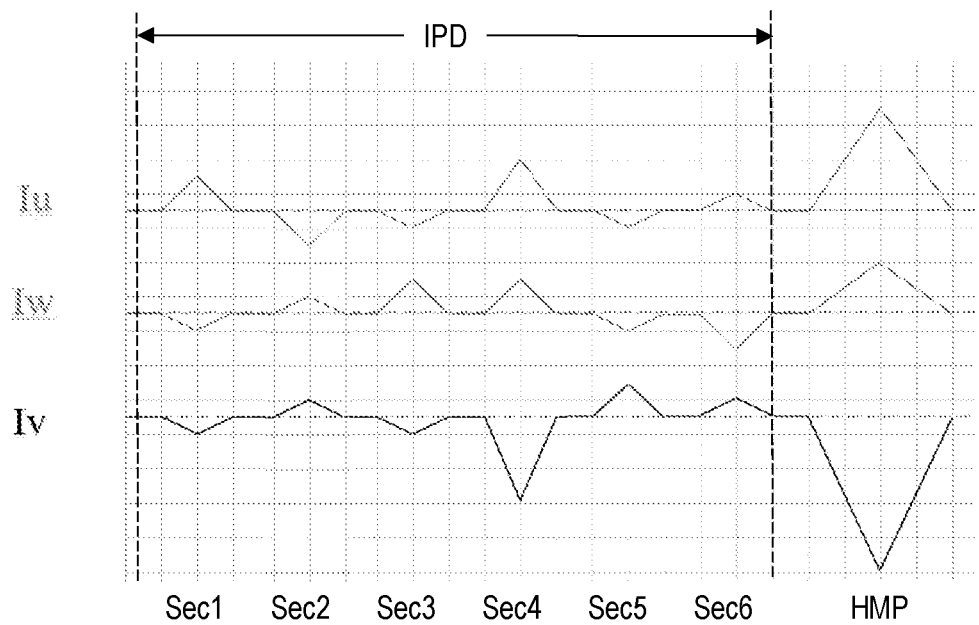
FIG. 14 depicts a current waveform diagram showing the motor phase currents during process described above, according to an embodiment.

FIG. 13 depicts a voltage waveform diagram showing the voltage signals Vu, Vw and Vv applied to the motor 104 from the power switch circuit 226 on power lines Pu, Pw and Pv respectively during process 300 described above, according to an embodiment. FIG. 14 depicts a current waveform diagram showing the motor phase currents during process 300 described above, according to an embodiment.

As shown in these figures, the high magnitude pulse (HMP) voltage has approximately double the wavelength of the voltage pulses applied during the IPD process. The current measurement of the high magnitude pulse similarly has double the amplitude of the largest IPD current measurement (e.g., in this example sector 4). This ensures that the HMP sufficiently saturates the motor and that the corresponding current measurement provides optimal resolution in the battery pack ID calculation.

Figure 15:
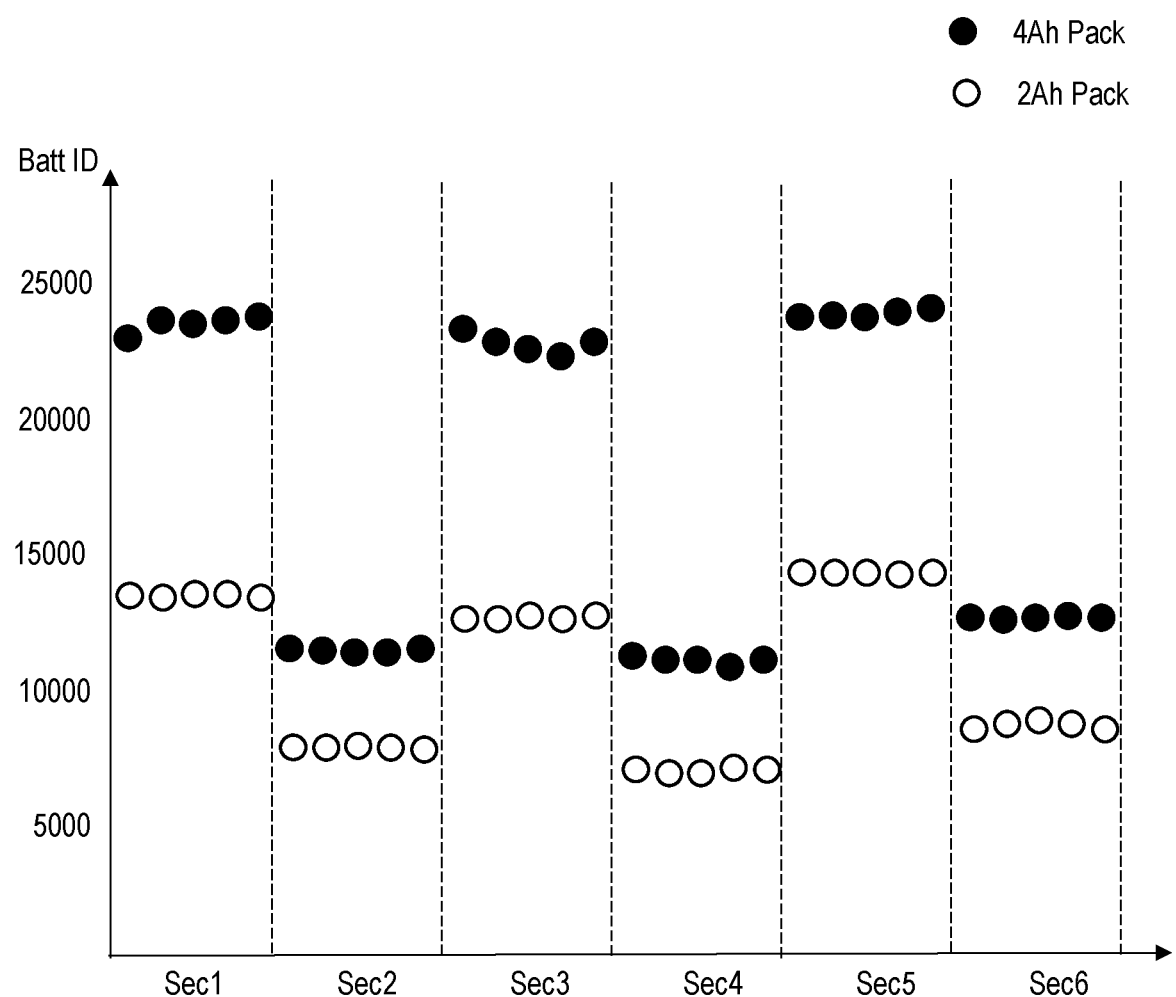
FIG. 15 depicts an exemplary graph showing the battery pack ID calculated for two different battery packs having different capacities, according to an embodiment.

FIG. 15 depicts an exemplary graph showing the battery pack ID calculated for two different battery packs having different capacities (e.g., 2 Ah v. 4 Ah). In this graph, the x-axis represents the current position of the rotor and the y-axis represents the battery pack ID calculation obtained from equation (2) discussed above. Due to salient structure of the motor associated with mounting structure of the rotor magnets, in this example, the motor exhibits lower inductance from the stator when the rotor is in an odd-numbered sector and higher inductance from the stator when the rotor is in an even-numbered sector. Thus, current measurements obtained from the motor are higher when the rotor is in an odd-numbered sector than when it is in an even-numbered sector.

While the current-measurements are sector-dependent, as shown in FIG. 15, the 4 Ah battery pack results in a consistently and measurably higher battery pack ID calculation than the 2 Ah battery pack. Accordingly, in an embodiment, the controller 230 may be configured to set a threshold value for each sector and identify the type (i.e., impedance and/or capacity) of battery pack based whether the calculated pack ID falls above or below the threshold value. Table 1 below provides an example of such a look-up table used by the controller 230 to set the threshold value.

TABLE 1

| Rotor Sector | Sector 1 | Sector 1 | Sector 1 | Sector 1 | Sector 1 | Sector 1 |
|---|---|---|---|---|---|---|
| Threshold Value | 18,000 | 10,000 | 18,000 | 9,000 | 19,000 | 11,000 |

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," "bottom," "lower," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The invention claimed is:

1. A power tool comprising:
    a housing including a battery receiving portion configured to receive a removeable power tool battery pack and a motor housing;
    a brushless direct-current (BLDC) motor disposed within the motor housing, the motor including a stator and a rotor;
    a power switch circuit disposed between the battery receiving portion and the motor; and
    a controller configured to control switching operation of the power switch circuit to regulate a supply of power from the battery pack to the motor, wherein at tool start-up, the controller is configured to apply a plurality of voltage pulses to the motor and measure a corresponding plurality of motor phase current values to identify an initial position of the rotor relative to the stator,
    the controller being further configured to identify at least one of an impedance or a rated capacity of the battery pack as a function of the plurality of motor phase current values, where the motor includes three phases and the plurality of phase current values includes six current signals.

2. The power tool of claim 1, wherein the controller is configured to measure a bus voltage of a bus line provided between the battery receiving portion and the power switch circuit, and calculate a battery identifier as a function of a sum of the plurality of phase current values divided by the bus voltage.

3. The power tool of claim 1, wherein the controller is further configured to apply a high magnitude voltage pulse to a sector of rotor orientation corresponding to the initial position of the rotor relative to the stator and measure a corresponding high-magnitude current value.

4. The power tool of claim 3, wherein the controller is further configured to monitor a bus voltage drop on a bus line provided between the battery receiving portion and the power switch circuit, and identify at least one of the impedance or the rated capacity of the battery pack as a function of the high-magnitude current value and the bus voltage drop.

5. The power tool of claim 1, wherein the controller is configured to calculate a battery identifier as a function of the plurality of motor phase current values, and identify the battery pack as a first type of battery pack having a first capacity if the battery identifier is below a threshold value and as a second type of battery pack having a second capacity if the battery identifier is above the threshold value.

6. The power tool of claim 5, wherein the controller is configured to set the threshold value based on the initial position of the rotor relative to the stator.

7. A power tool comprising:
    a housing including a battery receiving portion configured to receive a removeable power tool battery pack and a motor housing;
    a brushless direct-current (BLDC) motor disposed within the motor housing, the motor including a stator and a rotor;
    a power switch circuit disposed between the battery receiving portion and the motor;
    a bus line provided between the battery receiving portion and the power switch circuit; and
    a controller configured to control switching operation of the power switch circuit to regulate a supply of power from the battery pack to the motor, wherein at tool start-up, the controller is configured to apply a plurality of voltage pulses to the motor and measure a corresponding plurality of motor phase current values to identify an initial position of the rotor relative to the stator, the controller being further configured to apply a high magnitude voltage pulse to a sector of rotor orientation corresponding to the initial position of the rotor relative to the stator, measure a corresponding high-magnitude current value, and identify at least one of an impedance or a rated capacity of the battery pack as a function of the high-magnitude current value.

8. The power tool of claim 7, wherein the controller is further configured to monitor a bus voltage drop on the bus line, and identify at least one of the impedance or the rated capacity of the battery pack as a function of the high-magnitude current value and the bus voltage drop.

9. The power tool of claim 7, wherein the controller is further configured to identify at least one of the impedance or the rated capacity of the battery pack as a function of the plurality of phase current values.

10. The power tool of claim 9, wherein the controller is configured to measure a bus voltage of the bus line and calculate a battery identifier as a function of the high-magnitude current value, the plurality of phase current values, and the bus voltage.

11. The power tool of claim 7, wherein the controller is configured to calculate a battery identifier as a function of the plurality of motor phase current values, and identify the battery pack as a first type of battery pack having a first capacity if the battery identifier is below a threshold value and as a second type of battery pack having a second capacity if the battery identifier is above the threshold value.

12. The power tool of claim 11, wherein the controller is configured to set the threshold value based on the initial position of the rotor relative to the stator.

13. A power tool comprising:
a housing including a battery receiving portion configured to receive a removeable power tool battery pack and a motor housing;
a brushless direct-current (BLDC) motor disposed within the motor housing, the motor including a stator and a rotor;
a power switch circuit disposed between the battery receiving portion and the motor; and
a controller configured to control switching operation of the power switch circuit to regulate a supply of power from the battery pack to the motor, wherein at tool start-up, the controller is configured to apply a plurality of voltage pulses to the motor and measure a corresponding plurality of motor phase current values to identify an initial position of the rotor relative to the stator,
the controller being further configured to identify at least one of an impedance or a rated capacity of the battery pack as a function of the plurality of motor phase current values,
wherein the controller is configured to calculate a battery identifier as a function of the plurality of motor phase current values, and identify the battery pack as a first type of battery pack having a first capacity if the battery identifier is below a threshold value and as a second type of battery pack having a second capacity if the battery identifier is above the threshold value.

14. The power tool of claim 13, wherein the controller is configured to set the threshold value based on the initial position of the rotor relative to the stator.

* * * * *